(12) United States Patent
Matsuura et al.

(10) Patent No.: US 12,463,377 B2
(45) Date of Patent: Nov. 4, 2025

(54) CONNECTOR (71) Applicant: SUMITOMO WIRING SYSTEMS, LTD., Mie (JP)

(72) Inventors: Junya Matsuura, Mie (JP); Daisuke Kataoka, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 346 days.

(21) Appl. No.: 18/074,697

(22) Filed: Dec. 5, 2022

(65) Prior Publication Data

US 2023/0208076 A1 Jun. 29, 2023

(30) Foreign Application Priority Data

Dec. 24, 2021 (JP) .................................. 2021-210367

(51) Int. Cl.
*H01R 13/52* (2006.01)

(52) U.S. Cl.
CPC ....... *H01R 13/5219* (2013.01); *H01R 13/521* (2013.01)

(58) Field of Classification Search
CPC .......................... H01R 13/5219; H01R 13/521
See application file for complete search history.

(56) References Cited

U.S. PATENT DOCUMENTS

| | | | |
|---|---|---|---|
| 2017/0093080 A1* | 3/2017 | Fujikawa | H01R 13/10 |
| 2018/0342828 A1* | 11/2018 | Kobayashi | H01R 13/5208 |
| 2023/0208076 A1* | 6/2023 | Matsuura | H01R 13/5219 |
| | | | 439/271 |
| 2024/0120680 A1* | 4/2024 | Kanbara | H01R 13/74 |

FOREIGN PATENT DOCUMENTS

| | | | |
|---|---|---|---|
| JP | 2009043443 A | * | 2/2009 |
| JP | 2013-054898 A | | 3/2013 |
| JP | 2013-054899 A | | 3/2013 |
| JP | 2015122190 A | * | 7/2015 |

* cited by examiner

*Primary Examiner* — Felix O Figueroa
(74) *Attorney, Agent, or Firm* — Venjuris, P.C.

(57) ABSTRACT

A connector 10 is provided with a housing 11 and a rubber plug 12 to be mounted into the housing. The rubber plug 12 includes a plurality of rubber plug members (e.g. a first rubber plug member 12A, a second rubber plug member 12B and a third rubber plug member 12C) configured separately from each other and arranged side by side in a front-rear direction and a sealing hole 40 penetrating through the plurality of rubber plug members in the front-rear direction. An inner peripheral surface of the sealing hole 40 includes at least one lip (e.g. a first lip 43, a second lip 44) projecting inward. The number of the lips formed in each of the rubber plug members is at most 1.

12 Claims, 9 Drawing Sheets

Prior Art

CONNECTOR

CROSS-REFERENCE TO RELATED APPLICATIONS

This application is based on and claims priority from Japanese Patent Application No. 2021-210367, filed on Dec. 24, 2021, with the Japan Patent Office, the disclosure of which is incorporated herein in its entirety by reference.

TECHNICAL FIELD

The present disclosure relates to a connector.

BACKGROUND

Japanese Patent Laid-open Publication No. 2013-054898 discloses a connector provided with a rubber plug. This rubber plug is formed with a wire insertion hole. A plurality of lips are formed on the inner peripheral surface of the wire insertion hole. Note that a connector provided with a rubber plug is also disclosed in Japanese Patent Laid-open Publication No. 2013-054899.

SUMMARY

Figure 9:
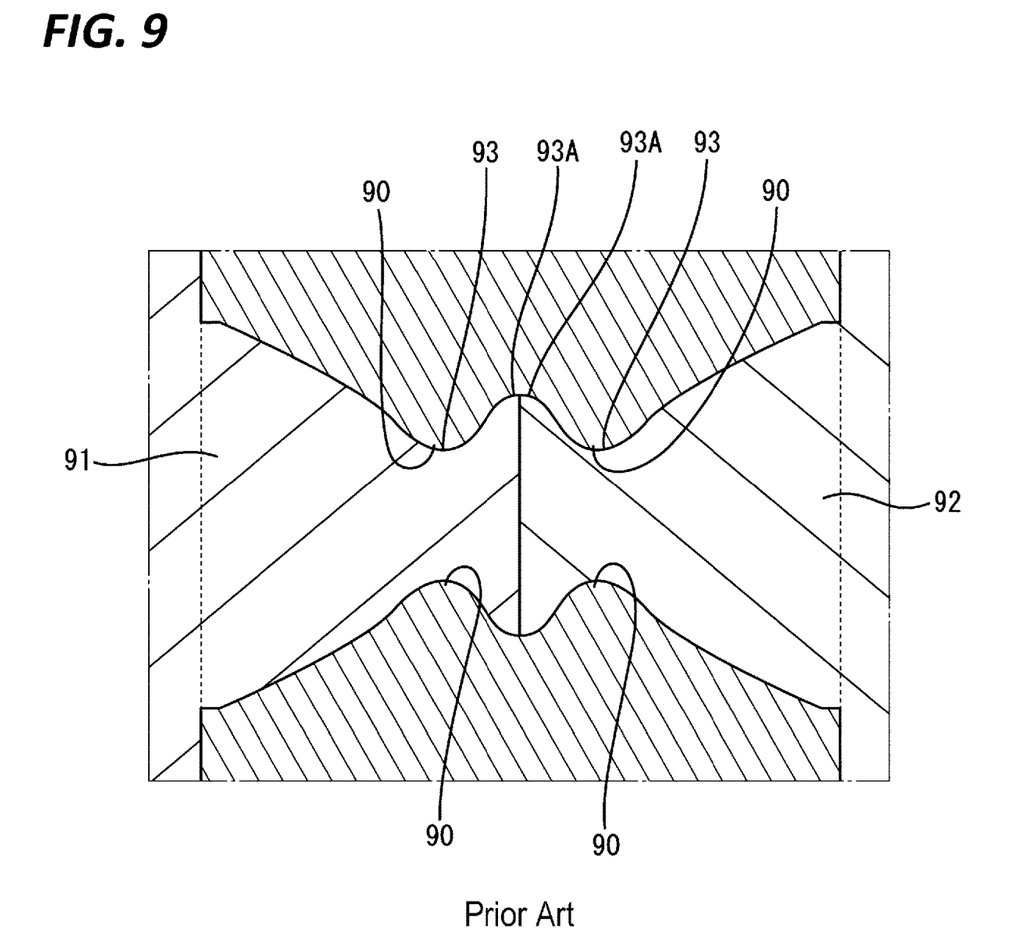
FIG. 9 is a side view in section showing an example of a conventional mold.

In the case of forming the plurality of lips on the inner peripheral surface of the wire insertion hole, at least one of molds 91, 92 for molding the rubber plug has to be formed with constricted portions 93 to correspond to the shape of the lips 90 as shown in FIG. 9 of the present disclosure. Thus, a large-diameter part 93A between the constricted portions 93 may be caught by the lips 90 in removing the molds after the rubber plug is molded, and it may not be possible to mold the lips 90 well.

Accordingly, the present disclosure provides a technique capable of easily molding lips.

The present disclosure is directed to a connector with a housing and a rubber plug to be mounted into the housing, the rubber plug including a plurality of rubber plug members configured separately from each other and arranged side by side in a front-rear direction and a sealing hole penetrating through the plurality of rubber plug members in the front-rear direction, an inner peripheral surface of the sealing hole including at least one lip projecting inward, and the number of the lips formed in each of the rubber plug members being at most 1.

According to the present disclosure, lips can be easily molded.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a housing and a rubber plug to be mounted into the housing, the rubber plug including a plurality of rubber plug members configured separately from each other and arranged side by side in a front-rear direction and a sealing hole penetrating through the plurality of rubber plug members in the front-rear direction, an inner peripheral surface of the sealing hole including at least one lip projecting inward, and the number of the lips formed in each of the rubber plug members being at most 1.

In the above connector, the rubber plug is composed of the plurality of rubber plug members configured separately from each other, and the number of the lips formed in each of the rubber plug members is at most 1. Accordingly, this lip can be molded even without forming constricted portions in molds. Thus, the lip is hardly caught by the molds during demolding and easily molded. Note that the shape of the lip is not particularly limited and may be a chevron shape in a side cross-section or a shape obtained by cutting a part (e.g. a half) of a chevron shape by a plane orthogonal to the front-rear direction.

(2) The sealing hole may be composed of divided sealing holes of the plurality of rubber plug members, and at least one rubber plug member, out of the plurality of rubber plug members, is provided with the lip in an end part on one side in the front-rear direction of the divided sealing hole and an inner diameter of an end edge in the end part on the one side of the divided sealing hole is smaller than an inner diameter of an end edge in an end part on the other side.

According to the above connector, even if the lip is formed by one mold, the mold is less likely to be caught by the lip by removing the mold from the other side in the front-rear direction. Thus, the lip is easily formed.

(3) A part of the at least one rubber plug member where an inner diameter of the divided sealing hole is minimum may be arranged closer to the other side than the end edge in the end part on the one side.

According to the above connector, a curved surface is easily formed on a tip part of the lip.

(4) The rubber plug may include a plurality of the rubber plug members formed with one lip, and the inner peripheral surface of the sealing hole may include a plurality of the lips.

According to the above connector, the plurality of lips can be provided on the inner peripheral surface of the sealing hole by combining the plurality of rubber plug members formed with one lip. That is, even if the plurality of lips are provided on the inner peripheral surface of the sealing hole, the molds for molding the respective rubber plug members need not be formed with constricted portions. Therefore, the lips are easily molded as compared to a conventional configuration in which constricted portions have to be formed.

(5) The sealing hole may be composed of divided sealing holes of the plurality of rubber plug members, the plurality of the lips may include a first lip and a second lip, the plurality of rubber plug members may include a first rubber plug member formed with the first lip, a second rubber plug member formed with the second lip and a third rubber plug member arranged between the first and second rubber plug members, and a minimum inner diameter of the divided sealing hole in the third rubber plug member may be larger than a minimum inner diameter of the divided sealing hole in the second rubber plug member.

According to the above connector, the second lip can be more reliably held in close contact with a wire inserted into the sealing hole.

(6) A hardness of the third rubber plug member may be higher than a hardness of the second rubber plug member.

According to the above connector, when the wire is inserted into the sealing hole from the side of the second rubber plug member, a movement of the second rubber plug member is more strongly restricted by the third rubber plug member and the second lip is easily resiliently deformed to enter the inside of the divided sealing hole in the third rubber plug member. Therefore, according to the above connector, an insertion force for the wire can be reduced.

(7) An inner diameter of the divided sealing hole in the third rubber plug member may be constant in the front-rear direction.

According to the above connector, the molds for molding the third rubber plug member are easily removed.

(8) The housing may include a first housing member and a second housing member to be locked to each other, and the plurality of rubber plug members may be arranged in a state compressed in the front-rear direction between the first and second housing members with the first and second housing members locked to each other.

According to the above connector, an insertion force can be reduced by inserting the wire into the sealing hole before the first and second housing members are locked to each other. By locking the first and second housing members to each other, the plurality of rubber plug members can be compressed in the front-rear direction and watertightness by the rubber plug can be improved.

Details of Embodiment of Present Disclosure

A specific example of the present disclosure is described below with reference to the drawings. Note that the present invention is not limited to these illustrations, but is represented by claims and intended to include all changes in the scope of claims and in the meaning and scope of equivalents.

Embodiment

Figure 1:
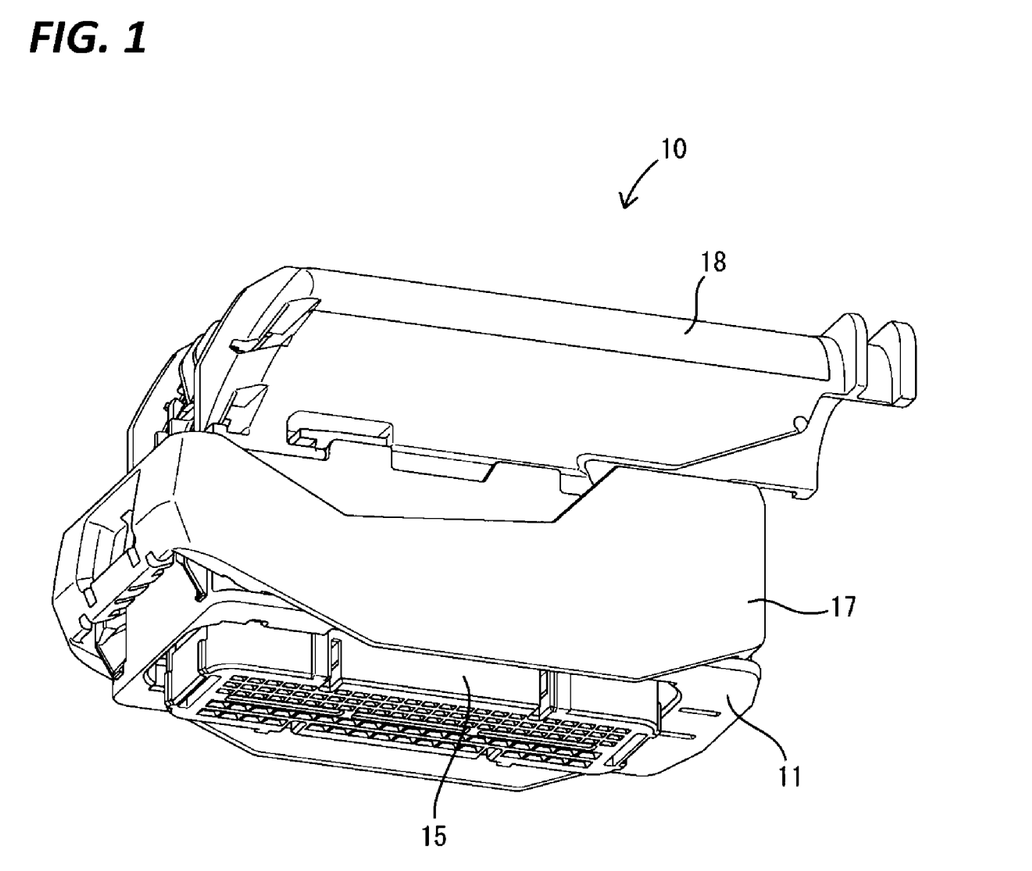
FIG. 1 is a perspective view of a connector of one embodiment.
Figure 7:
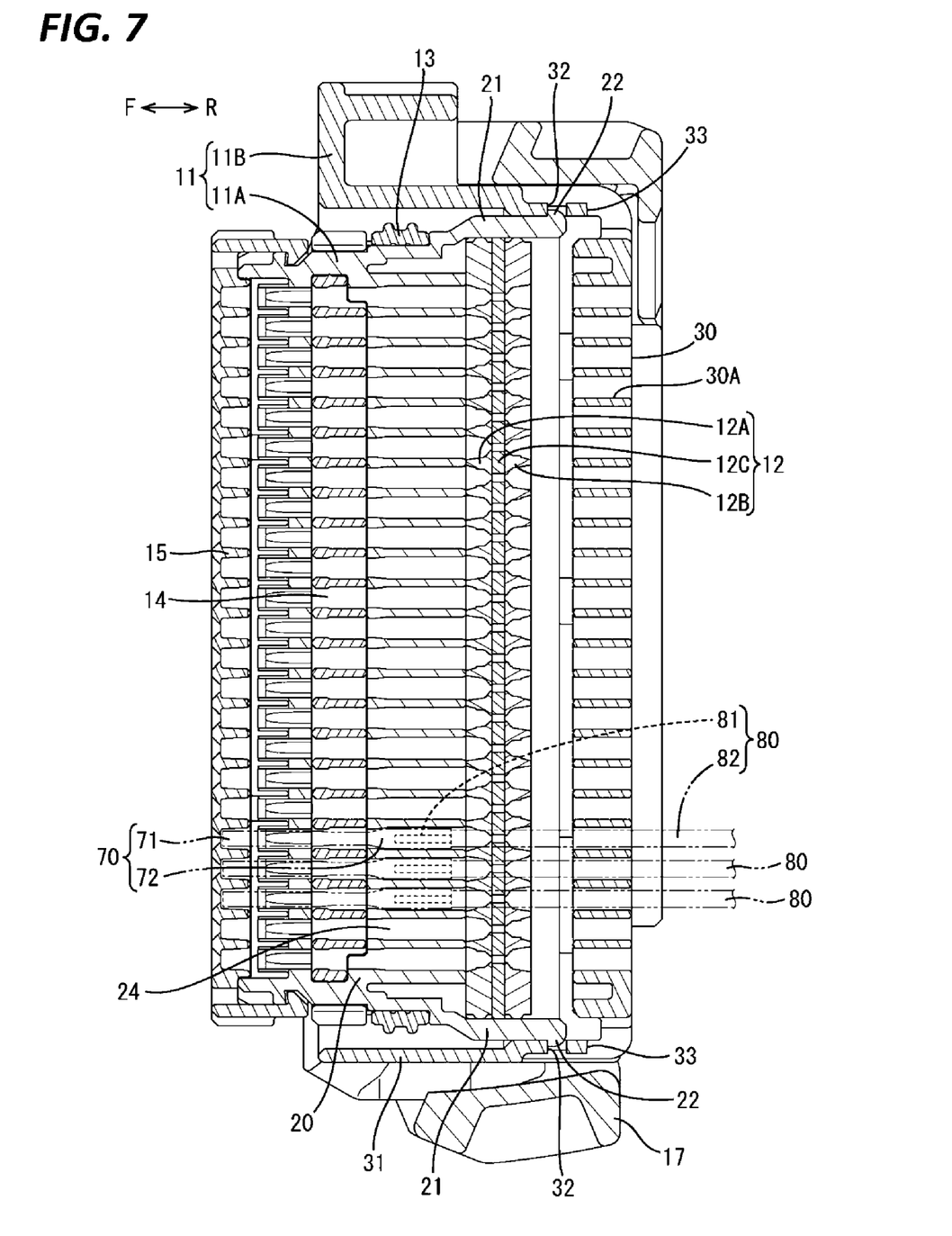
FIG. 7 is a plan view in section showing a state where a first housing member is temporarily locked to a second housing member.
Figure 8:
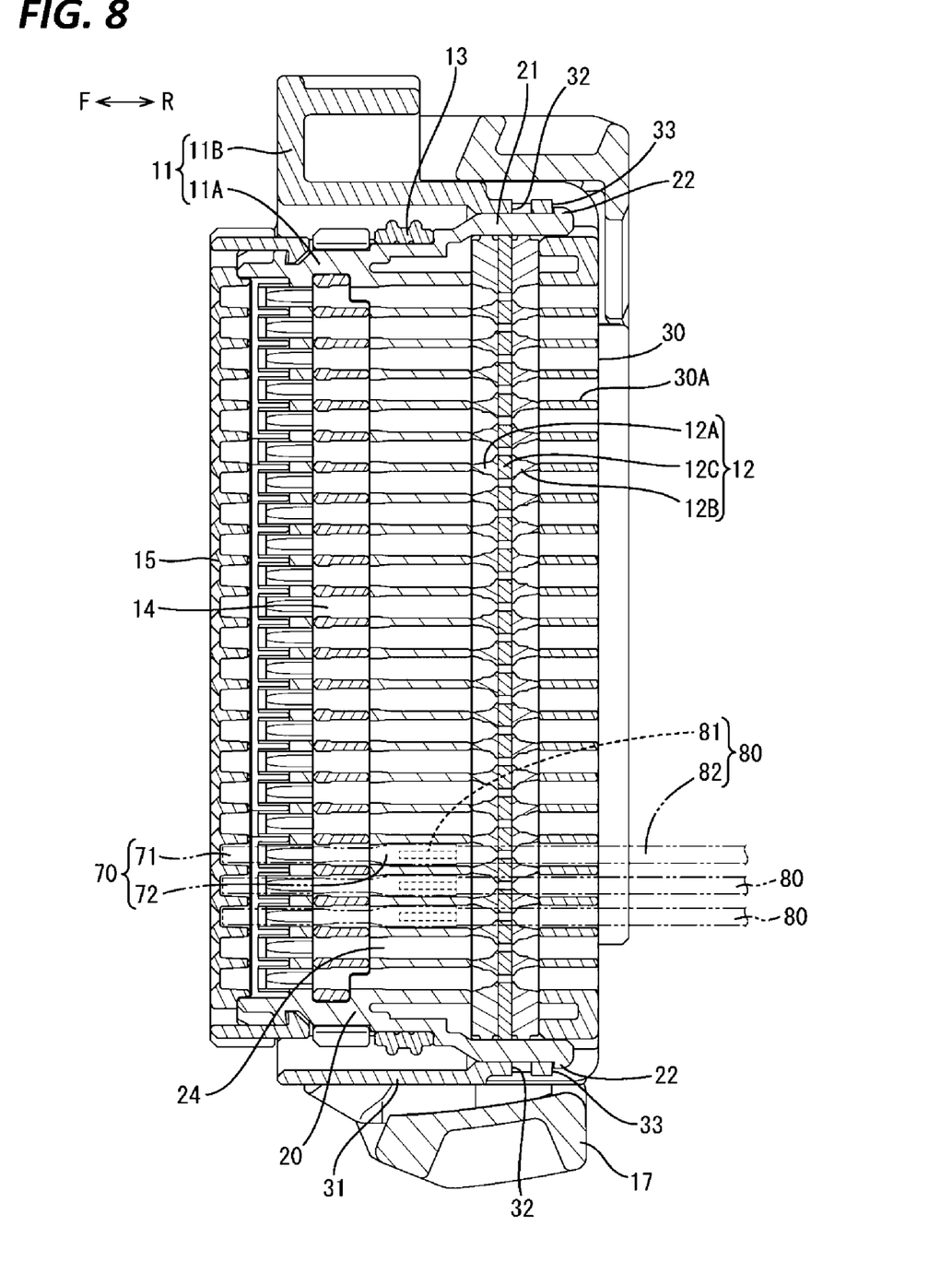
FIG. 8 is a plan view in section showing a state where the first housing member is completely locked to the second housing member.

FIG. 1 shows a connector 10 of one embodiment. The connector 10 is connected to an unillustrated mating connector. In the following description, a connecting direction of the connector 10 to the mating connector is referred to as a forward direction of the connector 10 and an opposite direction is referred to as a rearward direction of the connector 10. A vertical direction of FIGS. 7 and 8 is referred to as a width direction of the connector 10. A direction orthogonal to a front-rear direction and the width direction of the connector 10 is referred to as a height direction of the connector 10. Note that, a front side is denoted by "F" and a rear side is denoted by "R" in FIGS. 3 to 8.

Configuration of Connector 10

Figure 2:
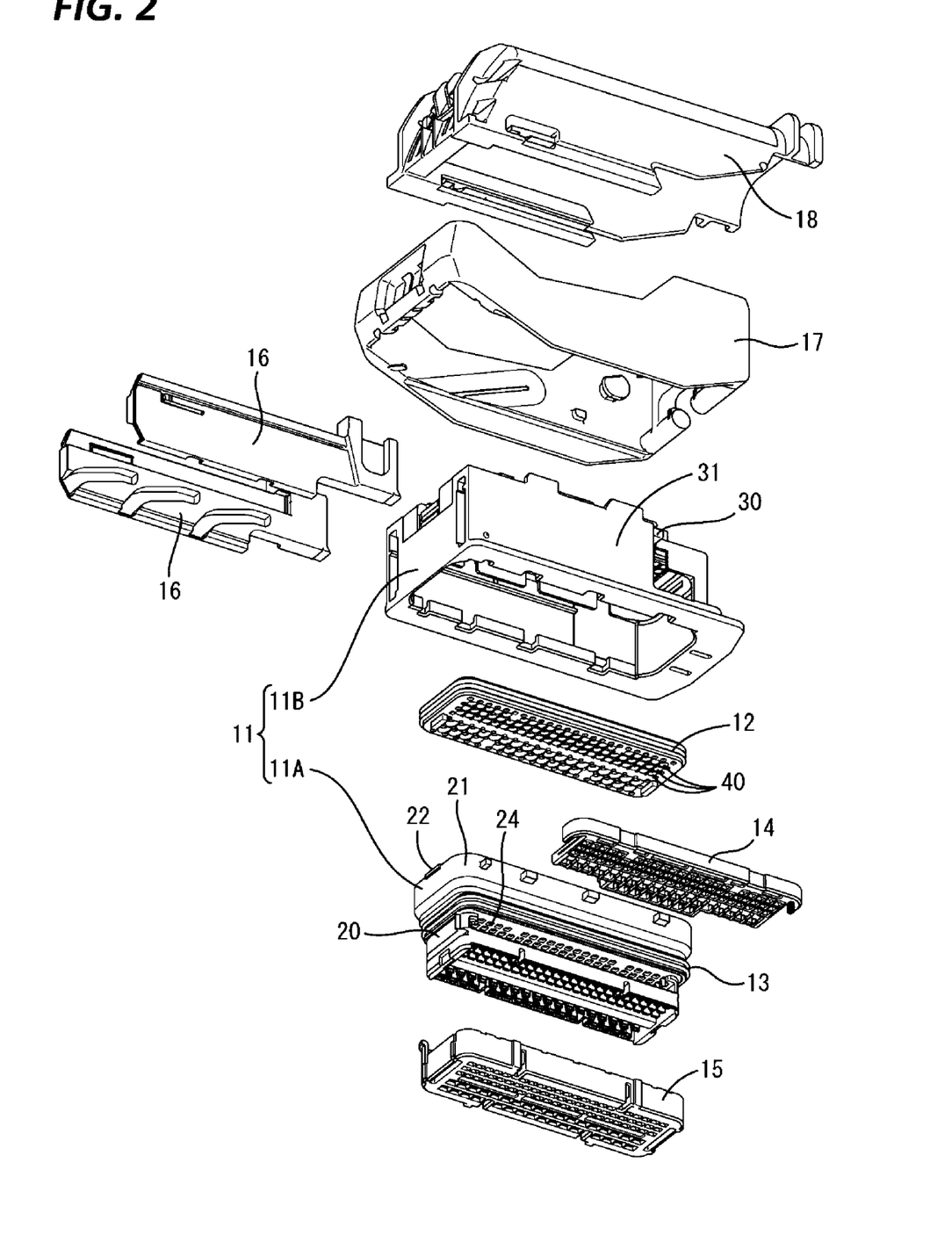
FIG. 2 is an exploded perspective view of the connector.

The connector 10 is a so-called lever-type connector. As shown in FIGS. 1 and 2, the connector 10 is provided with a housing 11, a rubber plug 12, a sealing ring 13, a retainer 14, a front member 15, sliders 16, a lever 17 and a cover 18.

Configuration of Housing 11

As shown in FIG. 2, the housing 11 includes a first housing member 11A and a second housing member 11B. The first housing member 11A is constituted as an inner housing, and the second housing member 11B is constituted as an outer housing. The first and second housing members 11A, 11B are locked to each other.

The first housing member 11A is made of synthetic resin and has an insulating property. As shown in FIGS. 2 and 8, the first housing member 11A includes a terminal accommodating portion 20, a rubber plug accommodating portion 21 and lock receiving portions 22.

As shown in FIG. 8, the terminal accommodating portion 20 includes cavities 24. The cavities 24 are formed to extend in the front-rear direction and exposed on both front and rear sides of the first housing member 11A. A plurality of the cavities 24 are provided at intervals in the width direction and height direction of the terminal accommodating portion 20. Terminal fittings 70 are inserted into the cavities 24 from behind.

The connector 10 includes the terminal fittings 70. As shown in FIG. 8, the terminal fitting 70 is a female terminal fitting. The terminal fitting 70 is electrically conductive. The terminal fitting 70 is formed, such as by bending a metal plate. The terminal fitting 70 includes a tubular (more specifically, rectangular tubular) body portion 71 and a wire connecting portion 72. An unillustrated mating terminal fitting is electrically connected to the body portion 71. A conductor 81 of a wire 80 is electrically connected to the wire connecting portion 72 by crimping or the like.

As shown in FIG. 8, the rubber plug accommodating portion 21 is in the form of a tube projecting rearward from an outer peripheral part of the terminal accommodating portion 20. An internal space of the rubber plug accommodating portion 21 communicates with the cavities 24 and is exposed rearwardly of the first housing member 11A. The rubber plug 12 is accommodated into the rubber plug accommodating portion 21 from behind. Unillustrated positioning pins are arranged to project rearward in the rubber plug accommodating portion 21. The rubber plug 12 is positioned by these positioning pins. The outer peripheral surface of the rubber plug 12 is held in close contact with the inner peripheral surface of the rubber plug accommodating portion 21. The rubber plug 12 accommodated in the rubber plug accommodating portion 21 is restricted from moving forward by contacting a rear end part of the terminal accommodating portion 20.

As shown in FIG. 8, the lock receiving portions 22 are provided on both sides in the width direction of the rubber plug accommodating portion 21. The lock receiving portions 22 are formed to protrude outward in the width direction from a rear end part of the rubber plug accommodating portion 21.

The second housing member 11B is made of synthetic resin and has an insulating property. As shown in FIGS. 2 and 8, the second housing member 11B includes a rear wall portion 30, a receptacle 31, temporary locking portions 32 and complete locking portions 33.

As shown in FIG. 8, the rear wall portion 30 is in the form of a wall having a thickness in the front-rear direction. The rear wall portion 30 includes through holes 30A penetrating through the rear wall portion 30 in the front-rear direction. A plurality of the through holes 30A are provided at intervals in the width direction and height direction. The terminal fittings 70 and the wires 80 are inserted through the through holes 30A.

As shown in FIG. 2, the receptacle 31 is in the form of a tube projecting forward from an outer peripheral part of the rear wall portion 30.

As shown in FIG. 7, the temporary locking portions 32 are provided on both sides in the width direction on a rear end side of the receptacle 31. The temporary locking portions 32 are in the form of slits long in the height direction. The temporary locking portions 32 lock the lock receiving portions 22 of the first housing member 11A. If the temporary locking portions 32 lock the lock receiving portions 22, the first housing member 11A is temporarily locked to the second housing member 11B.

As shown in FIG. 8, the complete locking portions 33 are provided on both sides in the width direction of the receptacle 31 behind the temporary locking portions 32. The complete locking portions 33 are in the form of slits long in the height direction. The complete locking portions 33 lock the lock receiving portions 22 of the first housing member 11A. If the complete locking portions 33 lock the lock receiving portions 22, the first housing member 11A is completely locked to the second housing member 11B.

Configuration of Rubber Plug 12

Figure 3:
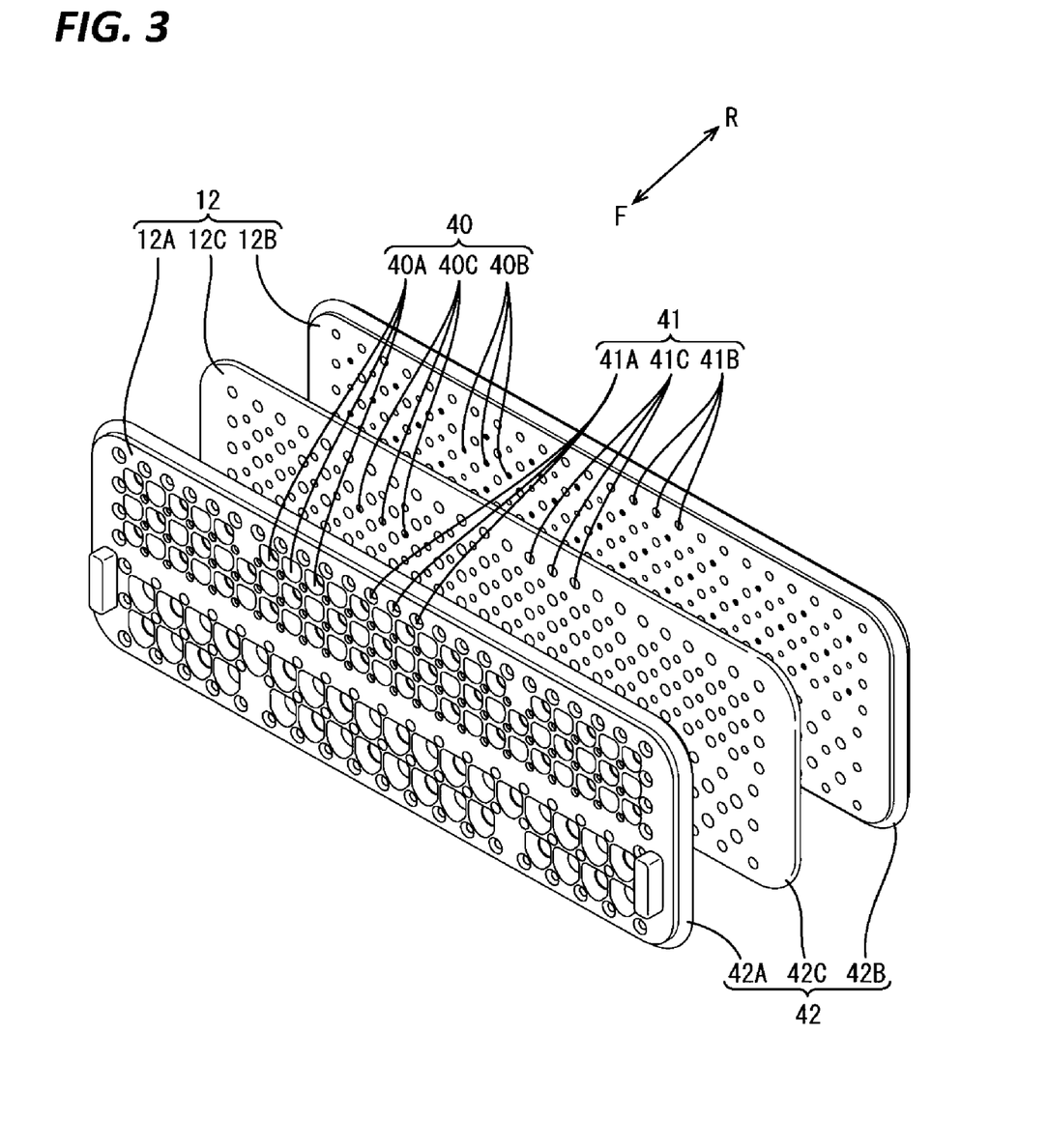
FIG. 3 is an exploded perspective view of a rubber plug.

As shown in FIG. 2, the rubber plug 12 is a one-piece rubber plug including a plurality of sealing holes 40. As shown in FIG. 3, the rubber plug 12 includes a first rubber plug member 12A, a second rubber plug member 12B and a third rubber plug member 12C. The first, second and third rubber plug members 12A, 12B and 12C are configured separately from each other and arranged side by side in the front-rear direction. The second rubber plug member 12B is arranged behind the first rubber plug member 12A. The third rubber plug member 12C is arranged between the first and second rubber plug members 12A, 12B. Each of the first, second and third rubber plug members 12A, 12B and 12C is in the form of a plate having a thickness in the front-rear direction and long in the width direction.

Figure 4:
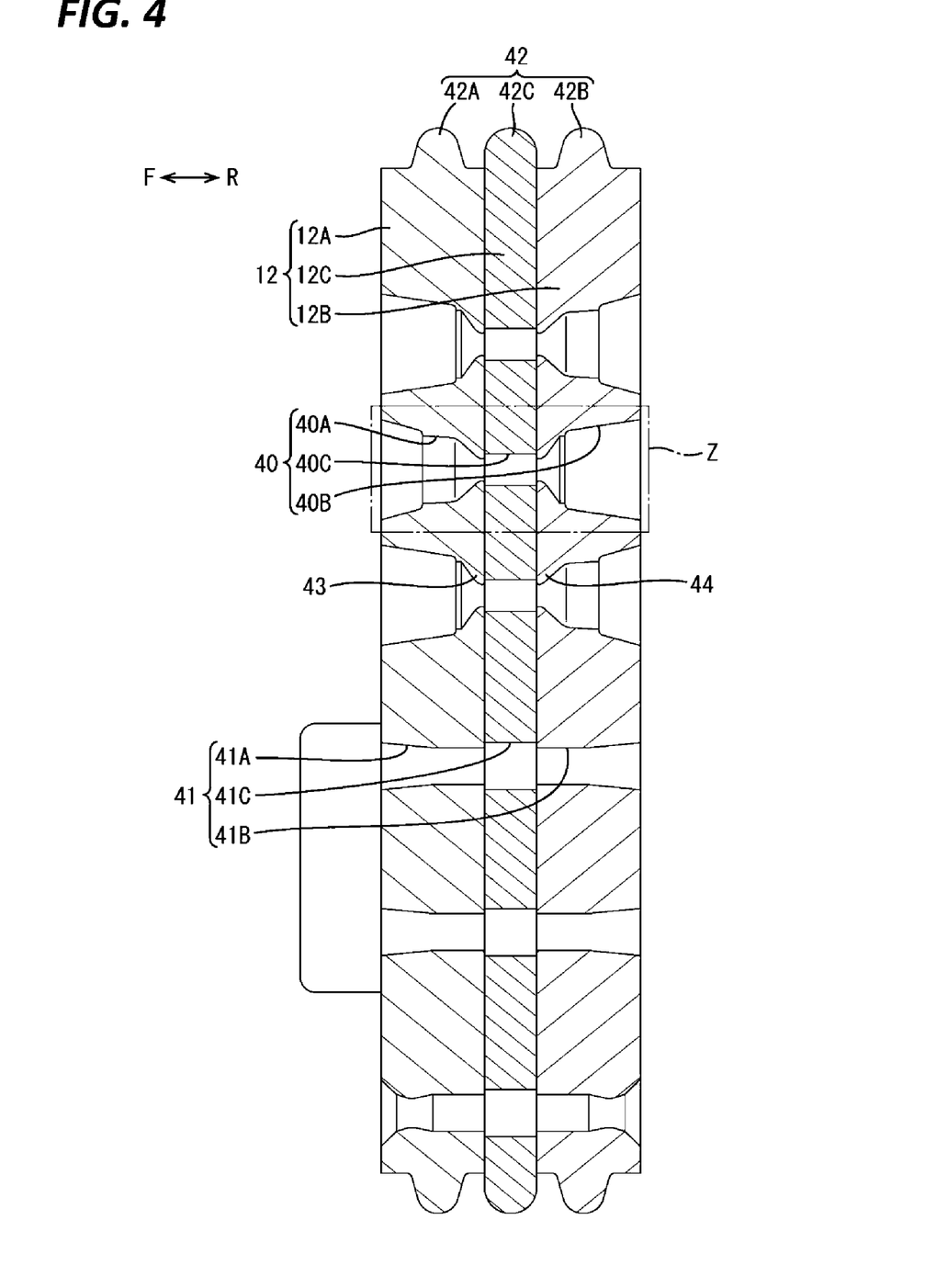
FIG. 4 is a side view in section of the rubber plug.

As shown in FIGS. 3 and 4, the sealing holes 40 penetrate through all of the first, second and third rubber plug members 12A, 12B and 12C in the front-rear direction. The first rubber plug member 12A includes first divided sealing holes 40A. The second rubber plug member 12B includes second divided sealing holes 40B. The third rubber plug member 12C includes third divided sealing holes 40C. The sealing hole 40 is composed of the first, second and third divided sealing holes 40A, 40B and 40C.

As shown in FIGS. 3 and 4, the rubber plug 12 includes pin insertion holes 41. The pin insertion holes 41 penetrate through all of the first, second and third rubber plug members 12A, 12B and 12C in the front-rear direction. The first rubber plug member 12A includes first divided insertion holes 41A. The second rubber plug member 12B includes second divided insertion holes 41B. The third rubber plug member 12C includes third divided insertion holes 41C. The pin insertion hole 41 is composed of the first, second and third divided insertion holes 41A, 41B and 41C.

As shown in FIGS. 3 and 4, the rubber plug 12 includes outer peripheral lips 42. The outer peripheral lips 42 are formed over the entire periphery of the outer peripheral surface of the rubber plug 12. The first rubber plug member 12A includes a first outer peripheral lip 42A. The first outer peripheral lip 42A is formed over the entire periphery of the outer peripheral surface of the first rubber plug member 12A. The second rubber plug member 12B includes a second outer peripheral lip 42B. The second outer peripheral lip 42B is formed over the entire periphery of the outer peripheral surface of the second rubber plug member 12B. The third rubber plug member 12C includes a third outer peripheral lip 42C. The third outer peripheral lip 42C is formed over the entire periphery of the outer peripheral surface of the third rubber plug member 12C. The outer peripheral lips 42 are composed of the first, second and third outer peripheral lips 42A, 42B and 42C.

Figure 5:
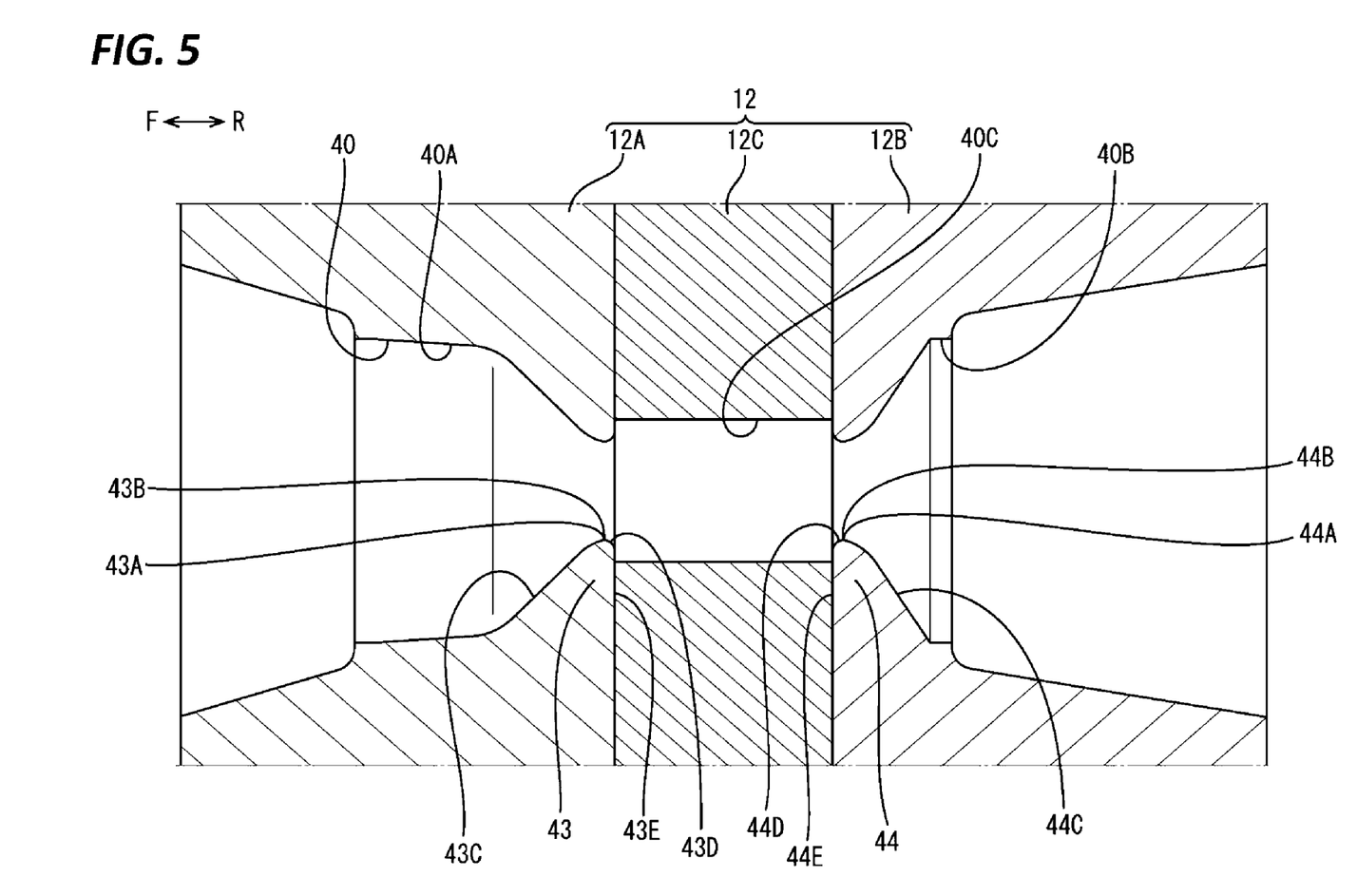
FIG. 5 is an enlarged view of a region Z in FIG. 4.

As shown in FIGS. 4 and 5, the inner peripheral surface of the sealing hole 40 includes a first lip 43 and a second lip 44. Each of the first and second lips 43, 44 is formed to project inwardly of the sealing hole 40 and formed over the entire periphery of the sealing hole 40.

As shown in FIG. 5, the first lip 43 is provided in the first divided sealing hole 40A of the first rubber plug member 12A. The first lip 43 is provided in a rear end part of the first divided sealing hole 40A. Thus, an inner diameter of the rear end edge of the first divided sealing hole 40A is smaller than that of the front end edge of the first divided sealing hole 40A. A tip 43A of the first lip 43 is arranged forward of the rear end edge of the first divided sealing hole 40A. Thus, a part 43B where the inner diameter of the first divided sealing hole 40A is minimum is arranged forward of the rear end edge of the first divided sealing hole 40A. According to this configuration, a curved surface is easily formed on a tip part of the first lip 43. The shape of the first lip is asymmetrical in the front-rear direction. The first lip 43 has a shape obtained by cutting a part of a general chevron-shaped lip in a plane orthogonal to the front-rear direction. The first lip 43 has a first front inclined surface 43C, a first rear inclined surface 43D and a first flat surface 43E. The first front inclined surface 43C is expanded forward from the tip 43A of the first lip 43. The first rear inclined surface 43D is expanded rearward from the tip 43A of the first lip 43. The first flat surface 43E spreads outward in a radial direction from the rear end edge of the first rear inclined surface 43D and is constituted by the rear surface of the first rubber plug member 12A.

As shown in FIG. 5, the second lip 44 is provided in the second divided sealing hole 40B of the second rubber plug member 12B. The second lip 44 is provided in a front end part of the second divided sealing hole 40B. Thus, an inner diameter of the front end edge of the second divided sealing hole 40B is smaller than that of the rear end edge of the second divided sealing hole 40B. A tip 44A of the second lip 44 is arranged rearward of the front end edge of the second divided sealing hole 40B. Thus, a part 44B where the inner diameter of the second divided sealing hole 40B is minimum is arranged rearward of the front end edge of the second divided sealing hole 40B. According to this configuration, a curved surface is easily formed on a tip part of the second lip 44. The shape of the second lip is asymmetrical in the front-front direction. The second lip 44 has a shape obtained by cutting a part of a general chevron-shaped lip in a plane orthogonal to the front-front direction. The second lip 44 has a second rear inclined surface 44C, a second front inclined surface 44D and a second flat surface 44E. The second rear inclined surface 44C is expanded rearward from the tip 44A of the second lip 44. The second front inclined surface 44D is expanded forward from the tip 44A of the second lip 44. The second flat surface 44E spreads outward in a radial direction from the front end edge of the second front inclined surface 44D and is constituted by the front surface of the second rubber plug member 12B.

No lip is provided in the third divided sealing hole 40C of the third rubber plug member 12C. An inner diameter of the third divided sealing hole 40C is constant in the front-rear direction. According to this configuration, molds for molding the third rubber plug member 12C are easily removed. The inner diameter of the third divided sealing hole 40C is larger than the minimum inner diameter of the first divided sealing hole 40A and smaller than a maximum inner diameter of the first divided sealing hole 40A. The inner diameter of the third divided sealing hole 40C is larger than the minimum inner diameter of the second divided sealing hole 40B and smaller than a maximum inner diameter of the second divided sealing hole 40B. The third rubber plug member 12C has a higher hardness than both of the first and second rubber plug members 12A, 12B.

The minimum inner diameter of the first divided sealing hole 40A, the minimum inner diameter of the second divided sealing hole 40B and the inner diameter of the third divided sealing hole 40C are all smaller than an outer diameter of a coating 82 of the wire 80. Thus, if the wire 80 is inserted into the sealing hole 40, the inner peripheral surface of the first divided sealing hole 40A, that of the second divided sealing hole 40B and that of the third divided sealing hole 40C are held in close contact with the outer peripheral surface of the wire 80.

As described above, the rubber plug 12 is configured by joining the first, second and third rubber plug members 12A, 12B and 12C. The rubber plug 12 includes two lips by providing one lip on each of the first and second rubber plug members 12A, 12B. Thus, the first lip 43 of the first rubber plug member 12A and the second lip 44 of the second rubber plug member 12B can be molded without forming constricted portions in the molds. That is, the connector 10 is so configured that the first and second lips 43, 44 are easily molded.

Figure 6:
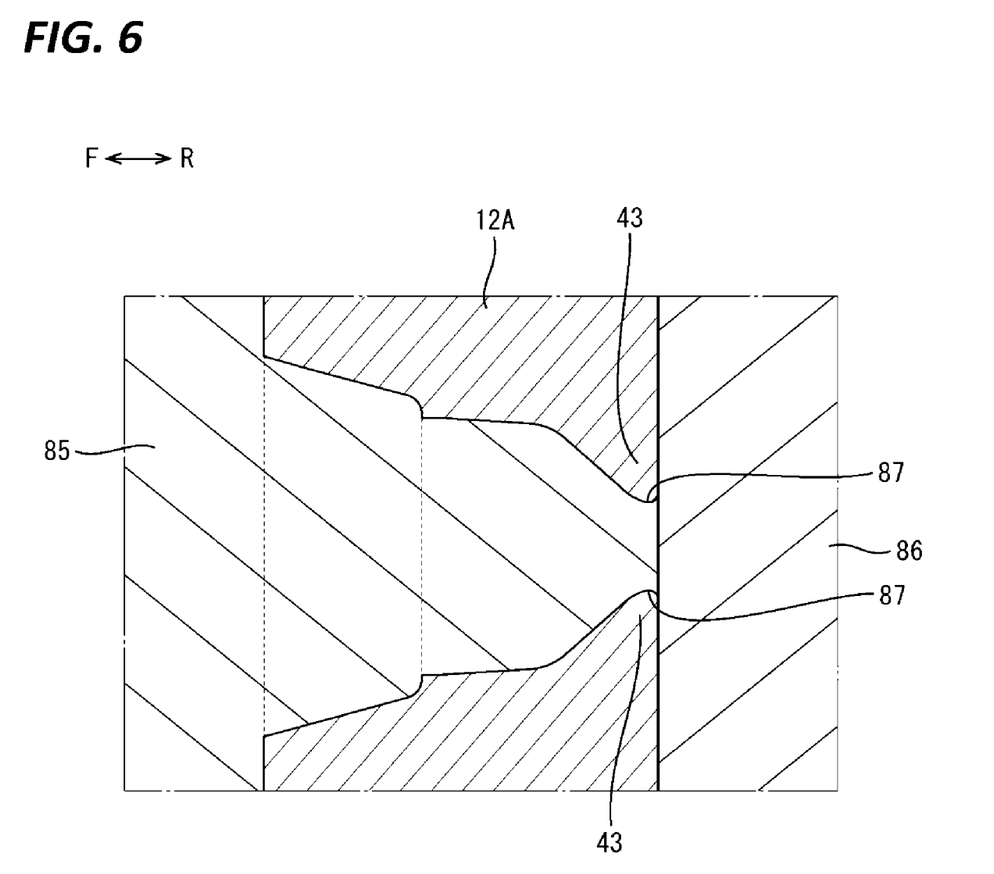
FIG. 6 is a side view in section of a first rubber plug member and molds.

Further, even if recesses 87 are formed as in a mold 85 shown in FIG. 6, the mold is hardly caught by the first lip 43 by being removed from front since the inner diameter of the rear end edge of the first divided sealing hole 40A is smaller than that of the front end edge. In this way, in the case of the molding the first lip 43 of the first rubber plug member 12A by the molds 85, 86, the mold 85 forms the entire first divided sealing hole 40A. Thus, the shape of the mold 86 can be simplified and the surface of the first lip 43 is easily formed to be smooth.

Assembling of Connector 10

First, the sealing ring 13 is mounted on the outer peripheral surface of the first housing member 11A. Then, the retainer 14 is temporarily locked to the first housing member 11A, and the front member 15 is mounted. Further, the sliders 16 and the lever 17 are mounted in and on the second housing member 11B.

The rubber plug 12 is accommodated into the rubber plug accommodating portion 21 of the first housing member 11A. The rubber plug 12 is positioned by inserting unillustrated positioning pins of the rubber plug accommodating portion 21 into the pin insertion holes 41. As shown in FIG. 7, the first housing member 11A is inserted into the receptacle 31 of the second housing member 11B from front. In the process of inserting the first housing member 11A, the lock receiving portions 22 of the first housing member 11A are pressed by the inner peripheral surface of the receptacle 31 and deflected inwardly in the width direction. When reaching the temporary locking portions 32, the lock receiving portions 22 return to their initial shapes by resilient forces. In this way, the lock receiving portions 22 of the first housing member 11A are locked by the temporary locking portions 32 of the second housing member 11B and the first housing member 11A is temporarily locked to the second housing member 11B.

In the temporarily locked state, the rubber plug 12 is arranged between the rear end part of the terminal accommodating portion 20 of the first housing member 11A and a front end part of the rear wall portion 30 of the second housing member 11B in the front-rear direction. An interval between the rear end part of the terminal accommodating portion 20 of the first housing member 11A and the front end part of the rear wall portion 30 of the second housing member 11B is larger than a thickness of the rubber plug 12 in the temporarily locked state. Thus, in the temporarily locked state, the rubber plug 12 is not compressed in the front-rear direction. In this state, the terminal fitting 70 connected to the wire 80 is inserted through the through hole 30A of the second housing member 11B from behind and also through the sealing hole 40 arranged in front of the through hole 30A. Since the rubber plug 12 is not compressed in the front-rear direction, a friction force acting on the terminal fitting 70 and the wire 80 is suppressed to be small That is, according to this configuration, an insertion force for the terminal fitting 70 and the wire 80 can be reduced.

Further, the inner diameter of the third divided sealing hole 40C is larger than the minimum inner diameter of the second divided sealing hole 40B. According to this configuration, the second lip 44 can be more reliably held in close contact with the wire 80 inserted into the sealing hole 40.

Furthermore, a hardness of the third rubber plug member 12C is higher than that of the second rubber plug member 12B. According to this configuration, a forward movement of the second rubber plug member 12B is more strongly restricted by the third rubber plug member 12C when the terminal fitting 70 and the wire 80 are inserted into the sealing hole 40 from behind. Thus, the second lip 44 is easily resiliently deformed to enter the inside of the third divided sealing hole 40C. Therefore, according to this configuration, an insertion force for the terminal fitting 70 and the wire 80 can be reduced.

The terminal fitting 70 is inserted up to the cavity 24 of the terminal accommodating portion 20. If the terminal fitting 70 is arranged in the cavity 24, the outer peripheral surface of the wire 80 is held in close contact with the inner peripheral surface of the sealing hole 40.

After the terminal fittings 70 are arranged in the cavities 24 and the wires 80 are arranged in the sealing holes 40, the first housing member 11A is inserted to a back side of the receptacle 31. As a result, the lock receiving portions 22 of the first housing member 11A are disengaged from the temporary locking portions 32 of the second housing member 11B and locked by the complete locking portions 33. In this way, the first housing member 11A is completely locked to the second housing member 11B. In the completely locked state, the interval between the rear end part of the terminal accommodating portion 20 of the first housing member 11A and the front end part of the rear wall portion 30 of the second housing member 11B is smaller than the thickness of the rubber plug 12. Thus, in the completely locked state, the rubber plug 12 is compressed in the front-rear direction by the rear end part of the terminal accommodating portion 20 of the first housing member 11A and the front end part of the rear wall portion 30 of the second housing member 11B. In this way, the inner peripheral surfaces of the sealing holes 40 in the rubber plug 12 and the outer peripheral surfaces of the wires 80 are more strongly held in close contact with each other, and watertightness by the rubber plug 12 is improved.

Thereafter, the cover 18 is mounted on the second housing member 11B, whereby the connector 10 is completed.

Other Embodiments of Present Disclosure

The embodiment disclosed this time should be considered illustrative in all aspects, rather than restrictive.

(1) Although the rubber plug is composed of three rubber plug members in the above embodiment, the rubber plug may be composed of two, four or more rubber plug members. If the rubber plug is composed of two rubber plug members, the rubber plug may be composed of only the rubber plugs including lips or composed of a rubber plug member including a lip and a rubber plug member including no lip.

(2) Although two lips are provided on the inner peripheral surface of the sealing hole in the above embodiment, one, three or more lips may be provided.

(3) Although the lip is provided in an end part in the front-rear direction of the divided sealing hole in the above embodiment, a lip may be provided on a central side in the front-rear direction of the divided sealing hole.

(4) Although the tip of the lip is arranged inwardly of the end edge in the front-rear direction of the divided sealing hole in the above embodiment, the tip of the lip may be arranged on the end edge in the front-rear direction of the divided sealing hole.

(5) Although the hardness of the third rubber plug member is higher than those of the first and second rubber plug members in the above embodiment, the hardness of the third rubber plug member may be equal to those of the first and second rubber plug members or may be lower than those of the first and second rubber plug members.

(6) Although the inner diameter of the divided sealing hole (third divided sealing hole 40C) in the third rubber plug member is constant in the front-rear direction in the above embodiment, this inner diameter may not be constant.

(7) Although no inner peripheral lip is formed on the inner peripheral surface of the pin insertion hole in the above embodiment, inner peripheral lip(s) may be formed.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
a housing; and
a rubber plug to be mounted into the housing, the rubber plug including
a plurality of rubber plug members configured separately from each other and arranged side by side in a front-rear direction, the plurality of rubber plug members including one rubber plug member arranged between two other rubber plug members, and
a sealing hole penetrating through each of the plurality of rubber plug members in the front-rear direction, the sealing hole formed as a plurality of divided sealing holes arranged in the front-rear direction in correspondence with the plurality of rubber plug members,
wherein:
the two other rubber plug members include at least one rubber plug member provided with a lip projecting inward from an inner peripheral surface of the sealing hole, and
the divided sealing hole of the one rubber plug member has a minimum inner diameter larger than a minimum inner diameter of a divided sealing hole of one of the two other rubber plug members.

2. The connector of claim 1, wherein:
the lip the lip of the at least one rubber plug member is disposed in an end part on one side in the front-rear direction of a corresponding one of the plurality of divided sealing holes, and
an end edge in the end part on the one side of the corresponding one of the plurality of divided sealing holes has an inner diameter smaller than an inner diameter of an end edge in an end part on the other side in the front-rear direction of the corresponding one of the plurality of divided sealing holes.

3. The connector of claim 2, wherein a part of the at least one rubber plug member where an inner diameter of the corresponding one of the plurality of divided sealing holes is minimum is arranged closer to the other side than the end edge in the end part on the one side.

4. The connector of claim 1, wherein:
each of the two other rubber plug members is formed with one lip, and
the inner peripheral surface of the sealing hole includes a plurality of lips.

5. The connector of claim 4, wherein:
the plurality of lips include a first lip and a second lip,
the two other rubber plug members include a first rubber plug member formed with the first lip and a second rubber plug member formed with the second lip, and
the one rubber plug member is formed as a third rubber plug member arranged between the first and second rubber plug members, a minimum inner diameter of the divided sealing hole in the third rubber plug member being larger than a minimum inner diameter of the divided sealing hole in the second rubber plug member.

6. The connector of claim 1, wherein a hardness of the one rubber plug member is higher than a hardness of one of the two other rubber plug members.

7. The connector of claim 1, wherein an inner diameter of the divided sealing hole in the one rubber plug member is constant in the front-rear direction.

8. The connector of claim 1, wherein:
the housing includes a first housing member and a second housing member to be locked to each other, and
the plurality of rubber plug members are arranged in a state compressed in the front-rear direction between the first and second housing members with the first and second housing members locked to each other.

9. The connector of claim 1, wherein:
a number of lips formed in any one of the plurality of rubber plug members is at most one, and the divided sealing hole of the one rubber plug member is not provided with a lip.

10. The connector of claim 1, wherein the divided sealing hole of the one rubber plug member has a constant inner diameter that is larger than a minimum inner diameter of a divided sealing hole of one of the two other rubber plug members and that is smaller than a maximum inner diameter of the divided sealing hole of the one of the two other rubber plug members.

11. The connector of claim 1, wherein:
a shape of the lip of the at least one rubber plug member is asymmetrical in the front-rear direction, the shape obtained by cutting a part of a chevron-shaped lip in a plane orthogonal to the front-rear direction, and
the lip of the at least one rubber plug member includes
a tip part,
an inclined surface being formed on one side of the tip part and facing toward an end edge in an end part on one side in the front-rear direction of a corresponding one of the plurality of divided sealing holes, and
a flat surface being formed on the other side of the tip part and facing toward an end edge in an end part on the other side in the front-rear direction of the corresponding one of the plurality of divided sealing holes.

12. A connector, comprising:
a housing; and
a rubber plug to be mounted into the housing, the rubber plug including
a plurality of rubber plug members configured separately from each other and arranged side by side in a front-rear direction, the plurality of rubber plug members including one rubber plug member arranged between two other rubber plug members, and
a sealing hole penetrating through each of the plurality of rubber plug members in the front-rear direction, the sealing hole formed as a plurality of divided sealing holes arranged in the front-rear direction in correspondence with the plurality of rubber plug members,
wherein:
the two other rubber plug members include at least one rubber plug member provided with a lip projecting inward from an inner peripheral surface of the sealing hole, and
an inner diameter of the divided sealing hole in the one rubber plug member is constant in the front-rear direction.

* * * * *